Nov. 10, 1959  J. L. FOWLER  2,912,193
AIRCRAFT CONTROLS

Filed Aug. 22, 1956  3 Sheets-Sheet 1

INVENTOR
JOHN L. FOWLER

BY Watson, Cole, Grindle
& Watson  ATTORNEYS

INVENTOR
JOHN L. FOWLER

BY
Watson, Cole, Grindle & Watson
ATTORNEYS

INVENTOR
JOHN L. FOWLER

# United States Patent Office 2,912,193
Patented Nov. 10, 1959

2,912,193
AIRCRAFT CONTROLS

John Lawrence Fowler, Hayes, England, assignor to The Fairey Aviation Company Limited, Hayes, England, a company of Great Britain Application August 22, 1956, Serial No. 605,530

Claims priority, application Great Britain August 23, 1955

7 Claims. (Cl. 244—83)

This invention relates to servo-operated aircraft controls and is concerned with means for introducing an artificial feel into a control, that is to say offering opposition to the movement of a control column or other operating member depending upon the extent of its movement from a zero position. It is desirable that the intensity of the feel, that is to say the magnitude of the opposing force produced at a given deflection of the operating member, should be variable to suit different conditions of flight, in particular indicated airspeed and Mach number. An object of the present invention is to provide a simple mechanism for enabling this to be achieved.

According to the present invention servo-operated aircraft control mechanism includes an operating member acted upon by a spring tending to oppose its movement from a zero position, and means for varying the rate of the spring. The spring is conveniently in the form of a cantilever blade and its rate may then be varied by providing a fulcrum which is movable along the length of the spring so as to vary its effective length.

In one form of the invention the blade is formed to an arc of a circle and the fulcrum is carried by an arm movable about the axis of the circle. The arm conveniently carries a roller engaging the spring.

Preferably the means for varying the effective length of the spring are automatically controlled in accordance with one or more parameters depending upon flight conditions. In particular it may be controlled, preferably through servo means, by a device responsive to Mach number and/or indicated airspeed.

Conveniently the spring is connected to the operating member through a cam and a cam follower the shape of which cam determines the variation of the spring deflection with deviation from zero position.

A clutch may be included in this connection between the operating member and the spring, so as to allow the spring to assume its zero position irrespective of the position of the operating member. The feel will then depend upon deviation of the operating member from the position in which it happens to be at that time, so that by operating such a trim control the pilot can ensure that the feel will depend upon deviation from the particular flight condition existing at that time when the trim control was operated.

Preferably, fail-safe means are provided, arranged to eliminate or reduce the feel in response to failure of a part of the control, e.g. the electrical or hydraulic system. Thus, if a failure occurs the fulcrum may be automatically set to give a maximum spring length.

The invention may be carried into practice in different ways and a specific example with some modifications will be described by way of example as applied to the servo-assisted operation of an aircraft control surface with reference to the accompanying drawings, of which:

Figure 1:
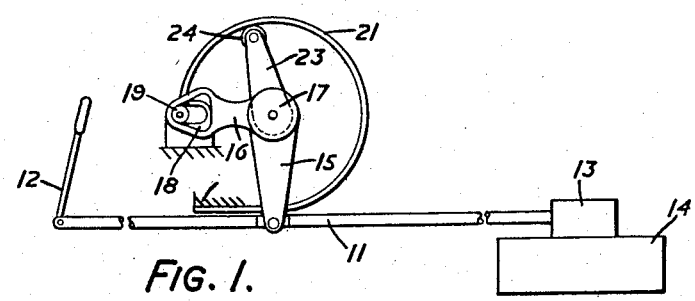
Figure 1 is a diagram of one arrangement for imparting artificial feel into a mechanism for setting the valve of a hydro-booster by movement of a control column.
Figure 2:
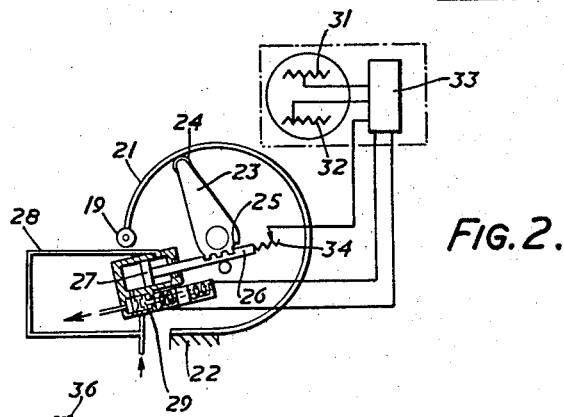
Figure 2 is a diagram corresponding to Figure 1 with parts removed to show the means for adjusting the fulcrum arm.

A control rod 11 is connected at one end to the control column 12 and at the other end to the valve 13 of a hydrobooster shown generally at 14. The valve 13 normally requires only a very small force to operate it so that there is substantially no feel or opposition to movement of the control column 12.

In order to provide such opposition the control rod 11 is connected to a control arm 15 pivoted co-axially with a cam arm 16 to which it is connected through a hydraulic clutch shown diagrammatically at 17. The cam arm 16 has in its end a substantially triangular cam slot 18 in which operates a cam follower formed by a roller 19 carried by one end of an arcuate blade spring 21 conveniently in the form of about three quarters of a circle mounted coaxially with the control arm 15 and cam arm 16 and having the end remote from the roller 19 firmly anchored at 22. Accordingly movement of the cam arm 16 in either direction causes the roller to ride up one or other two sides of the triangular cam slot 18 thereby bending the spring 21 inwards and introducing a force opposing such movement.

In order to vary the rate of the spring a fulcrum arm 23 is mounted to turn about the same axis as the cam arm 16 and carries at its end a roller 24 engaging the inner periphery of the spring 21. Accordingly the spring 21 acts as a cantilever and its rate varies in accordance with the position of the fulcrum arm 23. The closer the fulcrum arm 23 moves to the free end of the spring 21 the stiffer the spring will be and vice versa.

The movement of the fulcrum arm 23 is controlled by a pinion 25 secured to, or formed on, it and meshing with a rack 26 carried by the piston rod of a small two-to-one servo piston 27. Pressure fluid is permanently admitted through a line 28 to the side of the piston 27 of smaller area whilst the admission of such fluid to the side of larger area is controlled by a miniature valve 29, the movement of which is controlled by the outputs 31 and 32 from an instrument responsive to Mach number and an instrument responsive to indicated airspeed, amplified by a magnetic amplifier 33. A potentiometer 34 coupled to the piston rod provides a feed-back signal to the amplifier 33. Accordingly the position of the fulcrum arm 23 is varied automatically in accordance with a function of indicated airspeed and Mach number.

Figure 3:
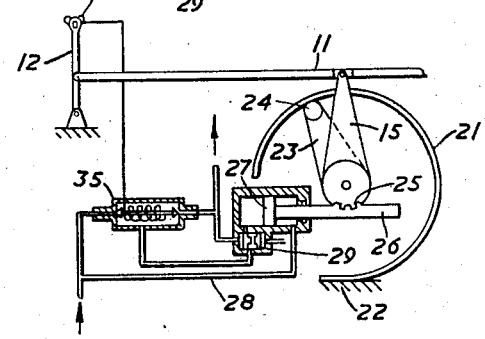
Figure 3 is a diagram corresponding to Figure 2 showing a modification of the arrangement.

Instead of being directly connected to the pressure supply the miniature valve 29 referred to may be connected through an electrically operated fail-safe valve 35 controlled by a fail-safe button 36 on the pilot's control column 12 as shown in Figure 3. Operation of this button 36 will then switch over the fail-safe valve 55 from pressure to exhaust. Accordingly both the inner and outer parts of the miniature valve 29 will be connected to exhaust so that whichever way it moves the large side of the piston 27 will be connected to exhaust and the pressure acting on its other side will return it to the position in which the spring 21 has a maximum effective length and the opposition to movement of the operating member is a minimum.

Figure 4:
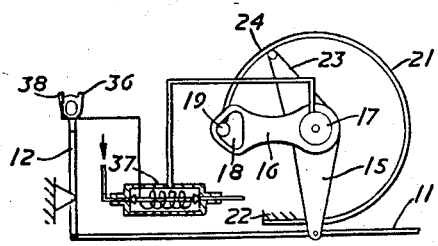
Figure 4 is a diagram showing how the hydraulic clutch is controlled.
Figure 5:
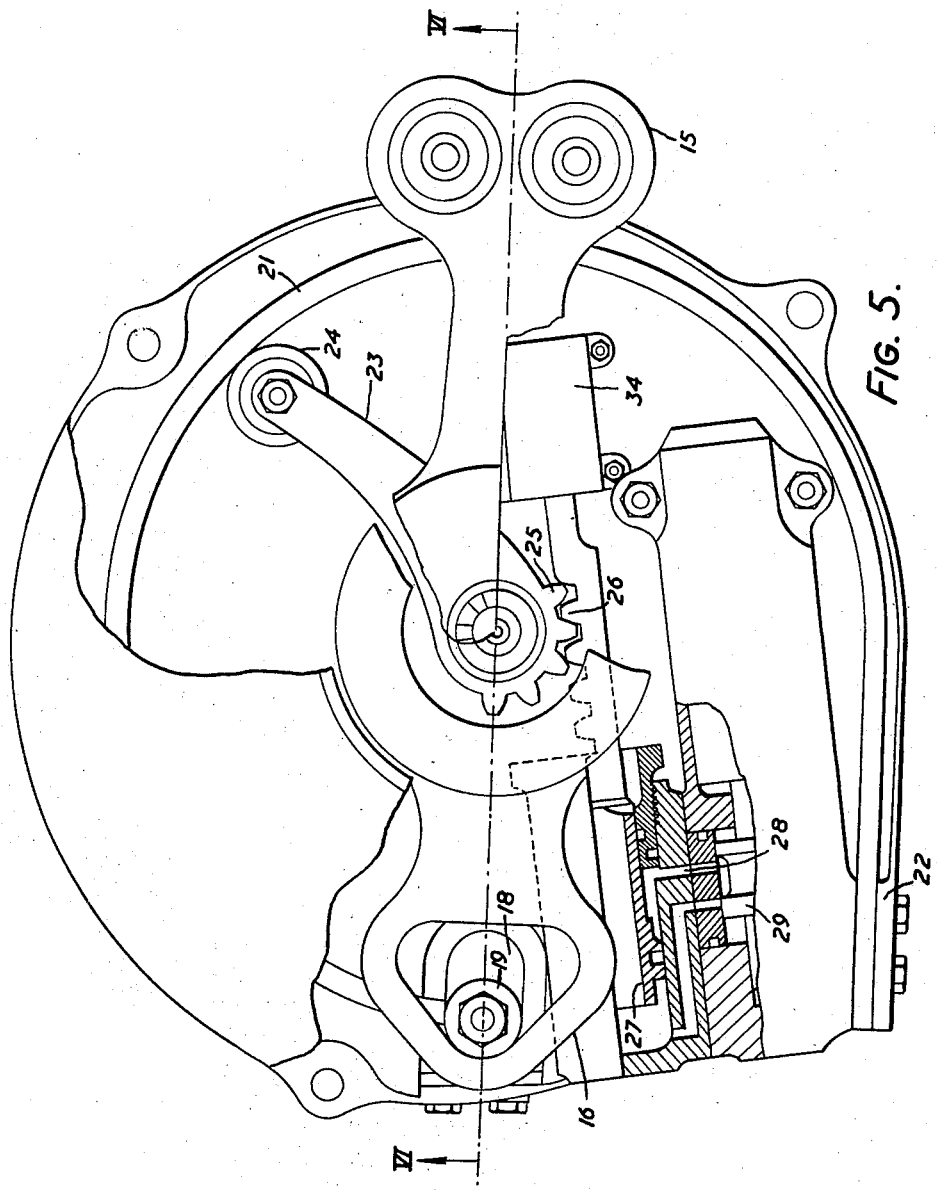
Figure 5 is a fragmentary enlarged view, looking from the same direction as in the diagrammatic views of Figures 1 and 2, but showing more fully the mechanisms of both these figures in their assembled relation.
Figure 6:
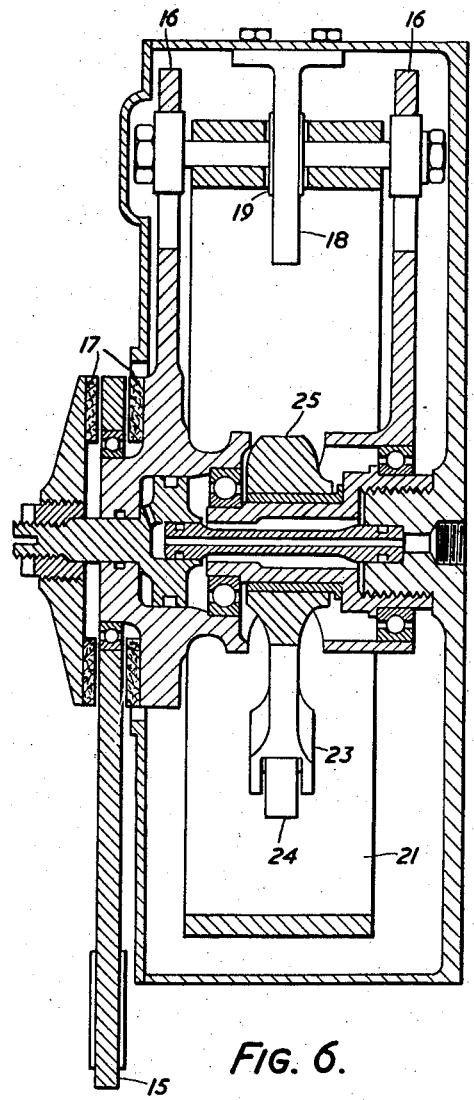
Figure 6 is a section on the line VI—VI of Figure 5, looking in the direction of the arrows.

As shown in Figure 4 the hydraulic clutch 17 referred to above between the control arm 15 and the cam arm 16 is controlled by an electro-hydraulic valve 37 under the control of a trim button 38 on the control column 12. Normally the valve 37 is set to connect the hydraulic clutch 17 to the pressure supply and keep the clutch 17 engaged. The pilot can however, press the trim button 38 to disengage the clutch 17, whereupon the cam follower arm will be moved by the spring 21 to its zero position 16, irrespective of the positon of the control column 12. In this way the pilot can reset the feel mechanism so as to be effective from any particular datum position of the control column 12.

What I claim as my invention and desire to secure by Letters Patent is:

1. Servo-operated aircraft control mechanism, including a power-operated servo mechanism operatively connected to a member to be actuated thereby, and a manual control member connected through a mechanical linkage to the control means of the servo mechanism, whereby movement of the manual control member from a zero position controls the operation of the servo mechanism to actuate the said member, a spring anchored at one end and mechanically linked at an operative point of its length to the manual control member to resiliently resist its movement out of the zero position, the spring comprising an arcuate cantilever blade spring which in the zero position conforms substantially to the greater part of the circumference of a circle, and means for progressively varying the rate of the spring by varying its effective length, the said means comprising a movable fulcrum afforded by the outer end of a radial arm pivoted about an axis through the center of the said circle, the fulcrum engaging the spring at a point whose distance from the said operative point of the spring is variable by rotation of the radial arm.

2. Control mechanism as claimed in claim 1 in which the fulcrum comprises a roller pivoted to the radial arm at its end, the periphery of the roller engaging the inner side face of the spring.

3. Control mechanism as claimed in claim 1 in which the means for varying the spring rate by rotating the radial arm comprises a motor controlled in accordance with a parameter dependent upon flight conditions.

4. Control mechanism as claimed in claim 3 in which the motor comprises a hydraulic jack acting on the radial arm through a rack and pinion connection and a manually-controlled hydraulic clutch, the hydraulic jack being controlled by an electro-hydraulic control valve itself actuated in response to an electrical signal derived from a generator responsive to the said parameter.

5. Control mechanism as claimed in claim 4 including fail-safe means arranged automatically to set a minimum spring rate in response to a failure of a part of the control.

6. Control mechanism as claimed in claim 5 including a pilot-actuated electro-hydraulic fail-safe valve arranged when actuated to condition the hydraulic jack to return the radial arm to the position of greatest effective spring length and minimum spring rate.

7. Control mechanism as claimed in claim 1 in which the spring is linked at its operative point to the manual control member through a double-acting cam and a co-operating cam follower, one carried by the spring at its operative point and the other connected to the manual control member, the cam being afforded by a cam plate having a generally triangular aperture of which one apex constitutes a zero position for the cam follower corresponding to the zero position of the spring, and the two adjacent sides of the aperture constitute oppositely inclined cam surfaces for respective engagement by the cam follower to deflect the spring in accordance with the direction of movement of the manual control member.

References Cited in the file of this patent

UNITED STATES PATENTS

| | | |
|---|---|---|
| 2,224,717 | Austin | Dec. 10, 1940 |
| 2,508,883 | Knowler et al. | May 23, 1950 |
| 2,673,049 | Talbot | Mar. 23, 1954 |
| 2,702,700 | Burritt | Feb. 22, 1955 |
| 2,725,203 | Blatz et al. | Nov. 29, 1955 |

FOREIGN PATENTS

| | | |
|---|---|---|
| 742,383 | Great Britain | Dec. 30, 1955 |